United States Patent

Neumann et al.

[11] Patent Number: 4,556,622
[45] Date of Patent: Dec. 3, 1985

[54] ELECTROPHOTOGRAPHIC RECORDING MATERIAL WHOSE PHOTOCONDUCTOR LAYER CONTAINS A HALOGENATED PERYLENE DYE SENSITIZER

[75] Inventors: Peter Neumann, Wiesloch; Karl-Heinz Etzbach, Frankenthal; Gerhard Hoffmann, Otterstadt, all of Fed. Rep. of Germany

[73] Assignee: BASF Aktiengesellschaft, Rheinland-Pfalz, Fed. Rep. of Germany

[21] Appl. No.: 667,730

[22] Filed: Nov. 2, 1984

[51] Int. Cl.$^4$ .................................. G03G 5/04
[52] U.S. Cl. ........................ 430/58; 430/80; 430/81; 430/83; 430/96
[58] Field of Search ............... 430/57, 58, 80, 81, 430/96, 83

[56] References Cited

U.S. PATENT DOCUMENTS

| | | | |
|---|---|---|---|
| 3,871,882 | 3/1975 | Wiedemann | 430/58 |
| 3,879,200 | 4/1975 | Regensburger et al. | 430/58 |
| 3,992,205 | 11/1976 | Wiedemann | 430/58 |

Primary Examiner—John L. Goodrow
Attorney, Agent, or Firm—Oblon, Fisher, Spivak, McClelland & Maier

[57] ABSTRACT

An electrophotographic recording material consists of (A) an electrically conductive base and (B) a photoconductor layer containing (a) a polymeric binder, which either is itself capable of transporting charge carriers or contains charge carrier-transporting compounds, and (b) sensitizers, with or without (c) other additives conventionally used in photoconductor layers.

Compounds (c), used according to the invention are compounds of the formula

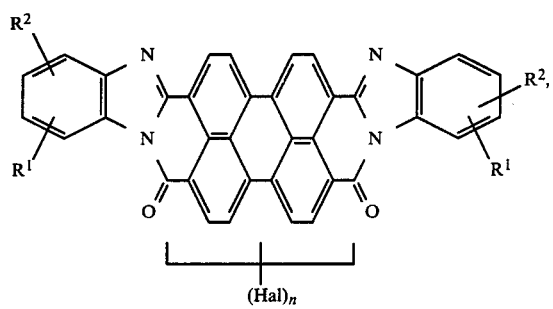

where $R^1$ is H or $C_1$-$C_8$-alkyl, $R^2$ is $C_1$-$C_8$-alkyl, Hal is Cl or Br and n is an integer from 2 to 6. The compounds (IV) are present as a molecular-disperse solution in the polymer matrix.

The recording materials are highly photosensitive over the entire visible range of light, and are therefore very useful for reprographic purposes.

13 Claims, No Drawings

ELECTROPHOTOGRAPHIC RECORDING MATERIAL WHOSE PHOTOCONDUCTOR LAYER CONTAINS A HALOGENATED PERYLENE DYE SENSITIZER

The present invention relates to an electrophotographic recording material consisting of an electrically conductive base and a photoconducting layer of organic materials.

Homogeneously sensitized photoconductor layers are known. For example, U.S. Pat. No. 3,484,237 describes organic photoconducting mixtures of poly-(N-vinylcarbazole) and 2,4,7-trinitrofluoren-9-one, in the form of a homogeneous layer on an electrically conductive base, and German Laid-Open Application DOS No. 2,841,925 describes photoconductive materials consisting of poly-(N-vinylcarbazole) and monodisperse solutions of sensitizers based on perylene-3,4:9,10-tetracarboxylic acid.

On the other hand, pigments based on perylene-3,4:9,10-tetracarboxylic acid are well known in electrophotographic recording systems, but are advantageously in the form of a double layer, ie. the substantially insoluble pigments are present in a separate, charge carrier-producing lower layer, in combination with a charge-transporting layer. For example, U.S. Pat. No. 3,904,407 claims dyes of the general formula

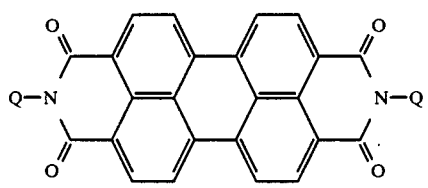

(I)

where Q is, for example, alkyl, aryl, alkylaryl, alkoxy or a heterocyclic radical, in particular p-chlorophenyl or p-methoxyphenyl.

German Laid-Open Application DOS No. 2,237,539 relates to electrophotographic elements which have a similar structure, the charge carrier-producing pigments claimed being those of the general formula

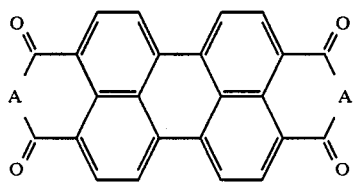

(II)

In this formula, A can be either oxygen or N—R, where R is hydrogen, $C_1$–$C_4$-alkyl, an unsubstituted or substituted aryl or aralkyl radical, a heterocyclic radical or —NHR', where R' is an unsubstituted or substituted phenyl or benzoyl radical.

Other pigments based on perylenetetracarboxylic acid and having the general formula (III), in which B is a fused-on aromatic system, are described in German Laid-Open Application DOS No. 2,314,051:

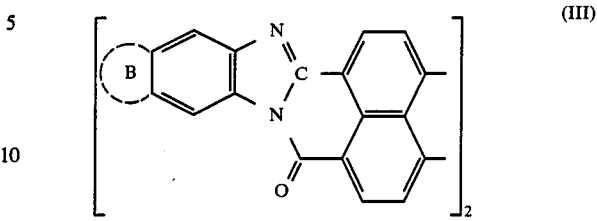

(III)

Chlorinated pigments of the formula (III) which have a defined chlorine content are described in German Laid-Open Application DOS No. 3,110,960.

Although the photoconductor properties of the layers containing poly-(N-vinylcarbazole) and 2,4,7-trinitrofluoren-9-one are very good, the unacceptable physiological properties of polynitroaromatics make it necessary to regard industrial utilization as dangerous. On the other hand, the conventional homogeneously sensitized layers which have been described possess unsatisfactory photoconductor properties. For example, the perylene dyes disclosed in German Laid-Open Application DOS No. 2,841,925 are yellow or orange products which do not permit any panchromatic sensitization of the photoconductor layer, a fact which is obvious to the skilled worker.

It is known that photoconducting double layers possess good photoconductor properties. However, they are expensive and difficult to prepare. For example, maintaining predetermined layer thicknesses is often particularly difficult in practice. Furthermore, the problems arising in the production of double coatings owing to the formation of an undefined boundary layer make it more difficult to manufacture such double layers in a reproducible manner, and it is for this reason that the expensive vapor deposition technique is preferably used for the production of the charge carrier-producing layer in the patent literature.

It is an object of the present invention to provide homogeneously sensitized photoconductor layers which can be applied readily and cheaply onto the base and possess in particular excellent photoconductor properties, panchromatic absorption characteristics and good solubility in the binders used, preferably in poly-(N-vinylcarbazole).

We have found that this object is achieved by the recording materials according to the invention.

We have found that excellent electrophotographic recording materials consisting of (A) an electrically conductive base and (B) a 0.8–40, preferably 6–15, μm thick photoconductor layer containing (a) a polymeric binder which either is itself capable of transporting charge carriers or contains low molecular weight charge-transporting compounds and (b) sensitizers for effecting panchromatic sensitization of the layer, with or without (c) other additives which improve the properties of the photoconductor layer, are obtained if the photoconductor layer contains, as sensitizers (b), compounds of the formula

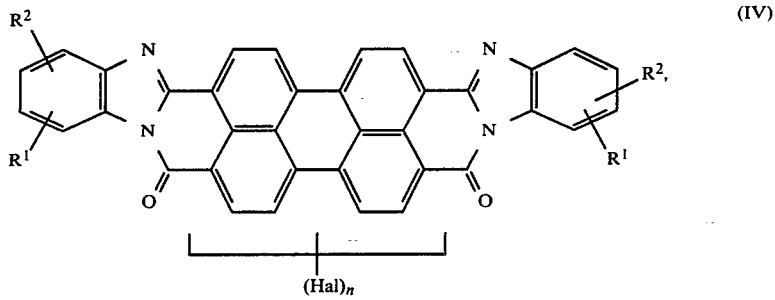

(IV)

where $R^1$ is hydrogen or $C_1$–$C_8$-alkyl, $R^2$ is $C_1$–$C_8$-alkyl, Hal is chlorine or bromine and n is an integer from 2 to 6, in a concentration of from 0.5 to 10% by weight, based on (a+b), and the sensitizers are present as a molecular-disperse solution in the binder matrix.

The novel electrophotographic recording materials are mechanically stable, highly photosensitive over the entire visible spectral range and hence very useful for reprographic purposes, for example as copying film for high-speed copiers using standard paper.

The finding that the novel layers can be given not only a negative electrostatic charge but also a positive one without there being any essential difference in the electrophotographic properties was surprising. The skilled worker knows that poly-(N-vinylcarbazole) is a defective electron conductor and therefore has to be given a negative electrostatic charge for optimum operation. This applies in particular to double layers which comprise a pigment-containing lower layer and a charge-transporting layer essentially consisting of poly-(N-vinylcarbazole), but also to photoconductor layers homogeneously sensitized with 2,4,7-trinitrofluoren-9-one. Hence, the skilled worker would not expect the photoconductor layer to be charged positively by the dyes (IV).

Specific examples of $R^1$ and/or $R^2$ are methyl, ethyl, n-propyl, isopropyl, n-butyl, sec.-butyl, isobutyl, tert.-butyl, n-pentyl, 1,1-dimethylpropyl, 1,2-dimethylpropyl, 2,2-dimethylpropyl, n-hexyl, n-heptyl, n-octyl and 2-ethylhexyl, n-butyl being preferred.

Suitable halogens are chlorine and bromine. For reasons relating to the synthesis, chlorine is preferred, but good results are also obtained when Hal is bromine.

The dyes of the formula IV are known (German Laid-Open Application DOS No. 3,148,206); those which are unknown can be prepared by a conventional method.

The dyes (IV) are obtained as mixtures of the cis and trans forms produced during the preparation.

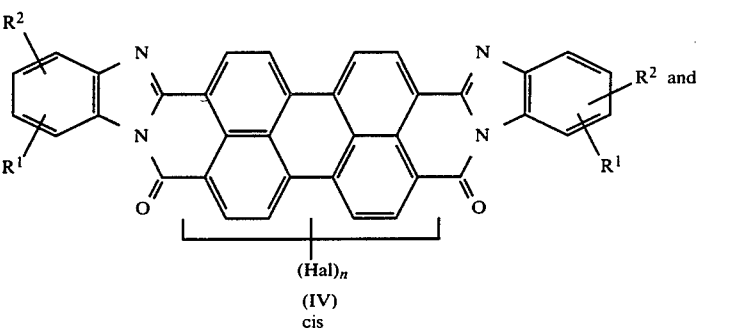

(IV)
cis

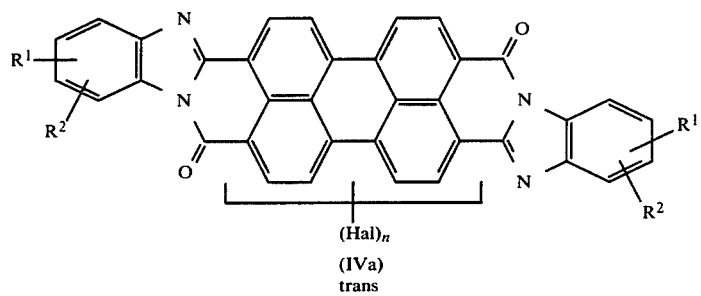

(IVa)
trans

Suitable further additives (c) which improve the properties of the photoconductor layer are those which do not hinder the action of the dyes used according to the invention; examples include (c1) commercial plasticizers, eg. dimethyl phthalate or silicone oil, for improving the quality of the surface, and (c2) activators and/or solubilizers.

The amounts of (c) can be as high as 25% by weight, based on (a+b).

The amount of (c1) can be as high as 15% by weight, based on (a+b).

The preferred electrophotographic recording materials according to the invention contain a photoconductor layer (B) comprising (a) from 90 to 98% by weight of poly-(N-vinylcarbazole),
(b) from 2 to 10% by weight of one or more dyes of the formula IV, where $R^1$ is hydrogen, $R^2$ is n-butyl, Hal is chlorine and n is 2, 3, 4 or 6, and
(c) from 0 to 25% by weight, based on (a+b), of further additives which improve the properties of the photoconductor layer.

Suitable additives (c) for improving the electrophotographic properties are, for example,
(c1) not more than 15% by weight, based on (a+b), of a commercial plasticizer, eg. dimethyl phthalate, and
(c2) activators and/or solubilizers.

It is possible to use, as polymeric binders (a) together with the compounds of the formula (IV), those polymeric binders which are themselves capable of transporting charge carriers, as well as polymers which cannot simultaneously act as charge-transporting compounds. In this case, it is necessary additionally to incorporate one or more conventional low molecular weight charge-transporting compounds into these polymers to permit them to be used as homogeneously sensitized photoconductor layers. All conventional binders possessing suitable properties can be used as polymers in this case, eg. polyvinyl chloride, polyesters, polyacetals, polycarbonates, polystyrene and styrene copolymers, silicone resins and cellulose derivatives.

Example of suitable low molecular weight charge-transporting compounds are pyrazoline derivatives, oxazoles, oxadiazoles, hydrazone derivatives, triphenylamines, benzotriazoles, pyrene derivatives and triphenylmethane derivatives. Poly-N-vinylcarbazole is the preferred binder.

The novel electrophotographic recording materials consist of
(1) a conductive base (A),
(2) if necessary, a 0.1–0.5, preferably about 0.2, μm thick barrier and adhesive layer, and
(3) the electrophotographic layer (B).

Suitable bases (A) are aluminum foils or sheets, nickel sheets or plastic films coated with metals by vapor deposition. 80–120 μm thick polyester films coated with aluminum by vapor deposition are particularly advantageous, and the aluminum coating should be about 300–500 Å thick.

The barrier and adhesive layers are known to the skilled worker and are, for example, metal oxide layers, polyacrylates, nylons, polystyrene, polyvinyl alcohol and their derivatives, and many others.

In order to improve the general properties, other constituents can be added to the electrophotographic layer, for example silicone oils for improving surface quality, sensitizers and activators which reinforce, but do not hinder, the action of the dyes according to the invention, and substances which improve the mechanical properties, eg. plasticizers generally.

To prepare the recording materials, a 10% strength by weight solution of the polymer in a suitable solvent is first prepared. The dyes (IV) used according to the invention are introduced into this solution, in solid form or as a solution. After all other additives have been introduced and the solution has been filtered, the latter is applied onto the conductive base so that the thickness of the wet layer is such that, after drying, a homogeneously sensitized layer of the desired thickness remains.

The Examples which follow illustrate the invention.

EXAMPLE 1

1 g of poly-(N-vinylcarbazole) was dissolved in 9 g of tetrahydrofuran. 0.05 g of the compound

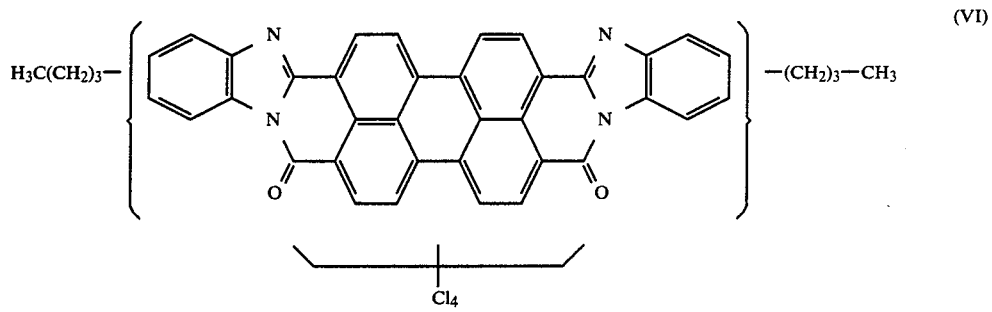

obtained by condensation of tetrachloroperylene-3,4:9,10-tetracarboxylic dianhydride with 4-n-butylphenylene-1,2-diamine, was added to the homogeneous solution. This solution was applied onto a 0.1 mm aluminum sheet to give a wet layer having a thickness such that, after evaporation of the tetrahydrofuran in the air and drying for 30 minutes at 80° C., the resulting dry layer was 10 μm thick. The layer is deep blue.

COMPARATIVE EXAMPLE A

The procedure described in Example 1 was followed, except that the compound (VI) was replaced by the corresponding unchlorinated compound. The dye did not dissolve, with the result that the solution of poly-(N-vinylcarbazole) obtained after filtration was as pale as water.

COMPARATIVE EXAMPLE B

The procedure described in Example 1 was followed, except that (VI) was replaced by the compound (VII)

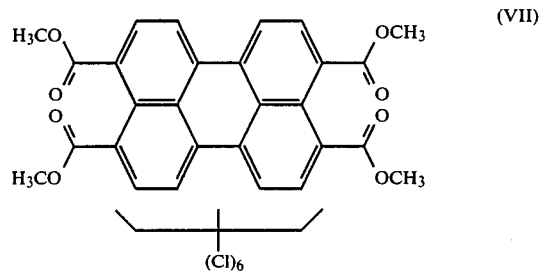

which is known from the literature (tetramethyl hexachloroperylene-3,4:9,10)-tetracarboxylate, German Laid-Open Application DOS No. 2,841,925). The layer has an intense yellow color.

EXAMPLE 2

0.05 g of the compound (VI) and 0.10 g of the compound (VII) were dissolved in a solution of 1 g of poly-(N-vinylcarbazole) in 9 g of tetrahydrofuran. This gave a recording material which had a black appearance in white light.

EXAMPLE 3

An 8 μm thick photoconductor layer was prepared using a solution of 1 g of a copolymer of 70% by weight of styrene, 24% by weight of acrylic acid and 6% by weight of maleic anhydride, having a mean molecular weight of 1800, 0.08 g of the compound (VI) and 0.8 g of 2-(p-diethylaminophenyl)-1,2,3-benzotriazole. This layer is deep blue.

The experiments below were carried out using the recording materials obtained as described in the Examples and in the Comparative Examples. The recording material was charged positively and negatively in separate experiments, this being done using a +8 kV or −8 kV Corona at a distance of 10 mm above the surface of the layer. After a charging time of 20 seconds, the surface potential was measured. The charged layers then remained in the dark for 20 seconds, after which the drop in potential which had taken place in the meantime was determined as a percentage of the measured initial potential. One sample in each case was then exposed for 1 second to light from a high pressure xenon lamp, exposure being carried out as follows:

(a) to the unfiltered white light, illumination in the plane of the layer: 60 $\mu W \times cm^{-2}$;

(b) to light filtered with an interference filter (maximum at 589 nm), illumination in the plane of the image: 6 $\mu W.cm^{-2}$; and (c) to light filtered with an interference filter (maximum at 650 nm), illumination in the plane of the image: 10 $\mu W.cm^{-2}$.

The drop in potential resulting from this exposure was then determined, in %.

The results obtained are summarized in Table 1.

The summary shows that the dyes according to the invention are substantially superior to the prior art.

TABLE 1

| | | Results of the measurements | | | | |
|---|---|---|---|---|---|---|
| | | Maximum surface potential [V] | Drop in potential after 20 seconds in the dark[1] [%] | Photoinduced drop in potential[1] for | | |
| Experiment | Charge | | | white light [%] | 589 nm [%] | 650 nm [%] |
| Example 1 | positive | 1550 | 8.3 | 96.2 | 82.4 | 82.0 |
| | negative | −1800 | 17.0 | 92.0 | 47.9 | 62.0 |
| Comparative Example A | | insoluble | | | | |
| Comparative Example B | positive | 2300 | 26.4 | 81.2 | 2.5 | 0 |
| | negative | −2850 | 20.6 | 78.6 | 0.8 | 0 |
| Example 2 | positive | 1800 | 14.8 | 88.4 | 83.8 | 81.6 |
| | negative | −2100 | 12.1 | 81.9 | 42.2 | 62.2 |
| Example 3 | positive | 660 | 15.1 | 39.0 | — | — |
| | negative | −850 | 19.5 | 42.5 | 39.0 | 37.2 |

[1] Based on the initial potential (column 3).

We claim:

1. An electrophotographic recording material, consisting essentially of:
   (A) an electrically conductive base; and
   (B) a 0.8-40 μm thick photoconductor layer, wherein said layer (B) essentially contains (a) a polymeric binder which itself is capable of transporting charge carriers or contains at least one low molecular weight charge-transporting compound, and (b) at least one sensitizer of the formula:

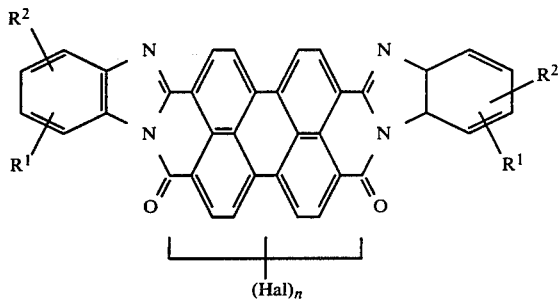

where $R^1$ is hydrogen or $C_1$-$C_8$-alkyl, $R^2$ is $C_1$-$C_8$-alkyl, Hal is chlorine or bromine and n is an integer from 2 to 6, the concentration of (b) being from 0.5 to 10% by weight, based on (a+b), and (b) being dissolved in the binder to give a molecular-disperse solution.

2. The electrophotographic recording material as claimed in claim 1, wherein, in the formula, $R^1$ is hydrogen, $R^2$ is n-butyl, Hal is chlorine and n is 4.

3. The electrophotographic recording material as claimed in claim 1, wherein the photoconductor layer furthermore contains (c) a plasticizer, one or more activators, a solubilizer or a mixture of these.

4. The electrophotographic recording material as claimed in claim 2, wherein the photoconductor layer furthermore contains (c) a plasticizer, at least one activator, a solubilizer or a mixture of these materials.

5. The electrophotographic recording material as claimed in claim 3, wherein the photoconductor layer contains not more than 15% by weight, based on (a+b), of (c).

6. The electrophotographic recording material as claimed in claim 4, wherein the photoconductor layer contains not more than 18% by weight, based on (a+b), of (c).

7. The electrophotographic recording material as claimed in claim 1, wherein said binder is poly-(N-vinylcarbazole) which is capable of transporting charge carriers.

8. The electrophotographic recording material as claimed in claim 2, wherein said binder is poly-(N-vinylcarbazole) which is capable of transporting charge carriers.

9. The electrophotographic recording material as claimed in claim 1, wherein said binder is polyvinyl chloride, a polyester, a polyacetal, a polycarbonate, a polystyrene, a copolymer based on styrene, a silicone resin or a cellulose derivative, and wherein said charge-transporting compound employed in combination with said binder is a compound selected from the group consisting of oxazoles, pyrazolines oxadiazoles, hydrazones, triphenylamines, benzotriazoles, pyrenes and triphenylmethanes.

10. The electrophotographic recording material as claimed in claim 4, wherein said binder is polyvinyl chloride, a polyester, a polyacetal, a polycarbonate, polystyrene, a copolymer based on styrene, a silicone resin or a cellulose derivative, and wherein said charge-transporting compound employed in combination with said binder is a compound selected from the group consisting of oxazoles, pyrazolines, oxadiazoles, hydrazones, triphenylamines, benzotriazoles, pyrenes and triphenylmethanes.

11. An electrophotographic recording material, comprising
(A) an electrically conductive base, and
(B) a 6-15 um thick photoconductor layer essentially containing
 (a) from 90 to 98% by weight of poly-N-vinylcarbazole and
 (b) from 2 to 10% by weight of a sensitizer of the formula

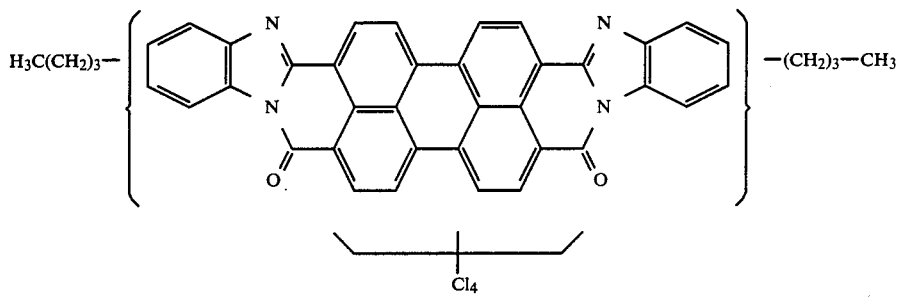

the percentages being based on (a+b).

12. The electrophotographic recording material as claimed in claim 11, wherein (B) contains from 0 to 25% by weight, based on (a+b), of at least one additive which improves the photoconductor layer.

13. The electrophotographic recording material as claimed in claim 11, wherein (B) contains from 0 to 15% by weight, based on (a+b), of a plasticizer (c).

* * * * *

UNITED STATES PATENT AND TRADEMARK OFFICE
CERTIFICATE OF CORRECTION

PATENT NO. : 4,556,622

DATED : December 3, 1985

INVENTOR(S) : Peter Neumann et al

It is certified that error appears in the above-identified patent and that said Letters Patent is hereby corrected as shown below:

Title page:

--The Priority Information in this Letters Patent has been omitted, please add the following Priority number:

November 2, 1983  Fed. Rep. of GERMANY  P 33 39 540.3--

Signed and Sealed this

Twenty-eighth Day of January 1986

[SEAL]

Attest:

DONALD J. QUIGG

Attesting Officer

Commissioner of Patents and Trademarks